US010029236B2

(12) United States Patent
Westermoen et al.

(10) Patent No.: US 10,029,236 B2
(45) Date of Patent: Jul. 24, 2018

(54) CATALYTIC SUBSTRATE SURFACE

(71) Applicant: Joma International AS, Nyborg (NO)

(72) Inventors: Andreas Westermoen, Frekhaug (NO); Mark Anthony Plunkett, Täby (SE); Matti Ben-Moshe, Reut (IL); Gleb Yakubov, Kettering (GB); Robert William Corkery, Stockholm (SE)

(73) Assignee: JOMA INTERNATIONAL A/S, Nyborg (NO)

( * ) Notice: Subject to any disclaimer, the term of this patent is extended or adjusted under 35 U.S.C. 154(b) by 0 days.

(21) Appl. No.: 14/816,086

(22) Filed: Aug. 3, 2015

(65) Prior Publication Data

US 2015/0336082 A1 Nov. 26, 2015

Related U.S. Application Data

(63) Continuation of application No. PCT/EP2014/052059, filed on Feb. 3, 2014.
(Continued)

(51) Int. Cl.
*B01J 21/06* (2006.01)
*B01J 35/04* (2006.01)
(Continued)

(52) U.S. Cl.
CPC ........... *B01J 21/063* (2013.01); *B01J 35/004* (2013.01); *B01J 35/0013* (2013.01); *B01J 35/04* (2013.01); *B01J 37/0215* (2013.01); *E01C 1/005* (2013.01)

(58) Field of Classification Search
CPC ...... B01J 21/063; B01J 35/04; B01J 35/0013; B01J 37/0215; B01J 35/004; E01C 1/005
See application file for complete search history.

(56) References Cited

U.S. PATENT DOCUMENTS 6,919,104 B2 * 7/2005 Marzolin ................. B05D 5/00
427/385.5
2002/0005145 A1 1/2002 Sherman
(Continued)

FOREIGN PATENT DOCUMENTS

EP 1160202 A1 12/2001
EP 1052225 B1 9/2004
(Continued)

OTHER PUBLICATIONS

Machine Translation of KR2012-0084438, published Jul. 30, 2012.*
(Continued)

*Primary Examiner* — Anthony J Zimmer
(74) *Attorney, Agent, or Firm* — Porter Wright Morris & Arthur LLP

(57) ABSTRACT

There is disclosed a catalytic substrate surface where in the substrate surface comprises particles in the size range 2-500 nm, said particles comprising $TiO_2$, wherein at least 50 wt % of the Ti in the particles is leachable in 37% HCl. A method for its manufacture is also provided. One advantage is that the higher fractions of Ti leachable in 37% HCl give a better coating with better adhesion, in particular on objects comprising protonatable acidic oxides, such as $SiO_2$. The higher fraction of Ti leachable in 37% HCl gives better transparency and dispersion stability. The resulting surface exhibits both improved activity and improved adhesion of the particles. There is no color change and/or speckles on the substrate, allowing anti-pollution surfaces to be produced also on decorative surfaces. The $TiO_2$-comprising layer is thin and easily applied in the production line.

18 Claims, 1 Drawing Sheet

Related U.S. Application Data

(60) Provisional application No. 61/760,125, filed on Feb. 3, 2013.

(51) Int. Cl.
  *B01J 35/00* (2006.01)
  *B01J 37/02* (2006.01)
  *E01C 1/00* (2006.01)

(56) References Cited

U.S. PATENT DOCUMENTS

| | | |
|---|---|---|
| 2011/0183838 A1 | 7/2011 | Fu et al. |
| 2011/0277818 A1* | 11/2011 | Shimura .............. H01G 9/2068 136/246 |
| 2012/0118723 A1* | 5/2012 | Mao ...................... B01J 21/063 204/157.52 |
| 2012/0283092 A1 | 11/2012 | Chapman |
| 2013/0164444 A1 | 6/2013 | Tokumitsu et al. |

FOREIGN PATENT DOCUMENTS

| | | |
|---|---|---|
| KR | 2012 0084438 | 7/2012 |
| WO | 2012/032868 A1 | 3/2012 |
| WO | 2013/074984 A1 | 5/2013 |

OTHER PUBLICATIONS

M. Jayasankar et al., Al2O3 @ TiO2—A simple sol-gel strategy to the synthesis of low temperature sintered alumina-aluminium titanate composites through a core-shell approach, Journal of Solid State Chemistry, 181:2748-2754 (published online Jul. 15, 2008).

Ahmet Faik Demirors et al., Seeded Growth of Titania Colloids with Refractive Index Tunability and Fluorophore-Free Luminescence, Langmuir, 37(5):1626-1634 (published online Jan. 10, 2011).

\* cited by examiner

CATALYTIC SUBSTRATE SURFACE

This application is a continuation of PCT/EP2014/052059 filed on 3 Feb. 2014, which claims priority to U.S. provisional 61/760,125, filed on 3 Feb. 2013, the entire contents of each of which are hereby incorporated by reference.

BACKGROUND

The present invention relates generally to a functionalized surface comprising photocatalytically active $TiO_2$ nanoparticles on a substrate surface, for instance a substrate comprising protonatable acidic oxides protonatable acidic oxides such as a cementitious, silicate or aluminasilicate for the purpose of removal contaminants such as $NO_x$.

There are several known inventions for removal of air pollutants by $TiO_2$ photocatalysis on paving stones, building facades, tunnel walls and similar surfaces. Most of these can be sorted into two groups.

The first group includes inventions based on $TiO_2$ powder or dispersion mixed into a top layer of cement, typically a few mm thick. Examples include those by Mitsubishi (Murata, 1997) and Italicementi (Cassar, 1997). These show very good durability and mechanical adhesion but require a large amount of $TiO_2$ per coated area than surface coatings require. For example a 2 mm cement layer with 5% $TiO_2$ and estimated density of 2.2 contains 220 g/m2 of $TiO_2$ nanoparticles. This must be added as powder since the amount of $TiO_2$ that can be added as dispersion is limited by the amount of water needed in the concrete and the maximum concentration that can be achieved in the dispersion without causing aggregation.

WO 2004/074202 discloses a cement paving block for a photocatalytic paving. The surface layer comprises a $TiO_2$-based photocatalyst. The $TiO_2$-based photocatalyst preferably has at least 70% anatase structure. The $TiO_2$ is present in a dry premix which is used to prepare the surface layer of the paving blocks.

EP 0786283 B1 discloses a paving block with a surface layer comprising cement, $TiO_2$, and sand. The thickness of the surface layer is 2-15, preferably 2-10 mm.

The second group is based on a $TiO_2$ dispersion applied to the cementitous surface. These give very thin active layers which can show good activity but generally have limited durability, particularly in the case where organic binders are used and over time break down due to the photocatalysis.

The international standard for assessing the air purification performance of $TiO_2$-functionalized surfaces is ISO 22917-1:2007.

Hüsken et al (2007) published ISO-results from five commercial NOx-removing paving stones, showing real values for NO degradation in the range 5.5%-39.1%. Hüsken teaches that having small well dispersed particles is more important than adding large amounts, and that applying the $TiO_2$ as a dispersion thus gives superior performance compared to powders.

WO 2007/074436 discloses a method for production of $TiO_2$ particles comprising the steps of providing an aqueous solution comprising titaniun ions or titanium complexes, keeping the temperature lower than 70° C. and hydrolyzing, adjusting the conditions by at least one of a) heating at least 1° C., b) changing pH at least 0.1 units, and c) diluting by at least 20%. There is disclosed a step to dehydrate particles at a calcination temperature in a range 90-900° C.

U.S. Pat. No. 2,819,174 discloses a process for manufacturing a titania hydrate dispersion. The pH is increased from below about 5 to a value between 5 and 11 by addition of an alkalizing agent such as acyclic alkonol monoamines.

U.S. Pat. No. 7,763,565 discloses a method of preparing stable, transparent photocatalytic titanium dioxide sols which involves thermal treatment of a suspension of amorphous titanium dioxide in the presence of certain alpha-hydroxy acids. The sots comprise titanium dioxide particles in the anatase form having a crystallite size less than about 10 μm.

US2013266370 discloses a concrete slab with two layers. The first layer of concrete is a base layer comprised of traditional concrete materials. In addition, the concrete slab construction includes a second exterior layer of concrete which contains photocatalyst particles. Preferred photocatalytic materials include titanium dioxide in the anatase form.

US2010234209 discloses a nano-particle comprising: a core of a size having a first electrically conducting or semiconducting material, a shell of a thickness having a second dielectric or semiconducting material, wherein the composition of said second material is different from the composition of said first material, and wherein the shell thickness is less than or equal to the core size.

US2010126845 discloses a cement composition, based on hydraulic binders, adapted to obtain coatings with a high photocatalytic activity and improved rheologic characteristics, including a hydraulic binder, a polycarboxylic or acrylic superfluidifying agent, a cellulosic ether with a viscosity in the range between 10000 and 120000 mPas, an adhesive agent, a calcareous, silicic or silicic-calcareous filler and a photocatalyst.

Even if the coatings and dispersions for coating according to the prior art are used today there is still room for an improvement regarding for instance the coating and adhesion properties. Further there is a room for improvement regarding the photocatalytic properties. Thus it is a problem how to improve the coating properties and the adhesion for $TiO_2$ particles applied from a dispersion. It is further a problem how to improve the photocatalytic properties.

SUMMARY

It is an object of the present invention to obviate at least some of the disadvantages in the prior art and provide an improved functionalized surface.

In a first aspect there is provided a substrate comprising a surface, said surface comprising particles in the size range 2-500 nm, said particles comprising $TiO_2$, wherein at least 50 wt % of the Ti in the particles is leachable in 37% HCl.

In a second aspect there is provided a method of manufacturing a coated substrate, said method comprising the steps of:
a) preparing a dispersion comprising particles in the size range 2-500 nm, said particles comprising $TiO_2$, wherein at least 50 wt % of the Ti in the particles is leachable in 37% HCl,
b) contacting the dispersion with the substrate to be coated.

Further aspects and embodiments are defined in the appended claims, which are specifically incorporated herein by reference.

One advantage is that the higher fractions of Ti leachable in 37% HCl give a better coating with better adhesion, in particular on objects comprising protonatable acidic oxides, such as $SiO_2$.

Another advantage is that the higher fraction of Ti leachable in 37% HCl gives better transparency and dispersion stability. Further it gives better redispersability. The high fraction of Ti leachable in 37% HCl gives the advantageous properties regarding gelling properties. An aqueous dispersion of the particles can form a gel and easily disperse upon shaking. The gelling properties are suitable for coating a substrate.

Yet another advantage is that the resulting surface exhibits both improved activity and improved adhesion of the particles. The durability of the adhesion is also improved.

Further there is no or only very little color change and/or speckles on the substrate, allowing anti-pollution surfaces to be produced also on decorative surfaces.

The $TiO_2$-comprising layer is thin and easily applied in the production line.

BRIEF DESCRIPTION OF THE DRAWINGS

The invention is now described, by way of example, with reference to the accompanying drawings, in which.

DETAILED DESCRIPTION

Figure 1A:
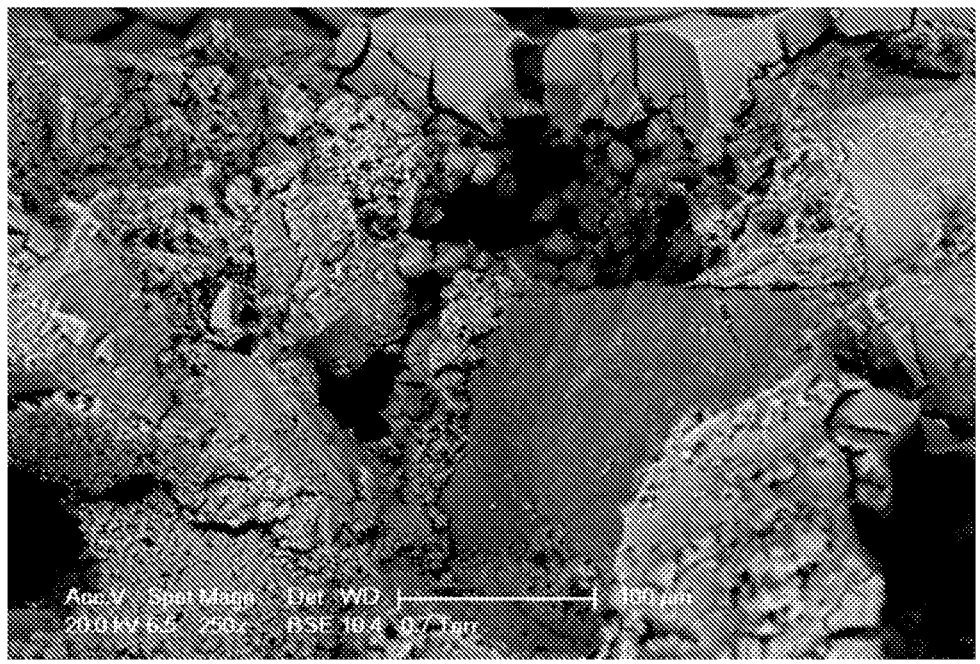
FIG. 1a shows a scanning electron micrograph of a cross section through a fractured piece of a sample according to the invention, with concentrations of $TiO_2$ given as gray levels in FIG. 1b using energy dispersive x-ray imaging on the same sample area as FIG. 1a. High concentrations of $TiO_2$ derived from the precursor dispersion were seen at least 300 micrometer into the paving stone porous substructure.

Before the invention is disclosed and described in detail, it is to be understood that this invention is not limited to particular compounds, configurations, method steps, substrates, and materials disclosed herein as such compounds, configurations, method steps, substrates, and materials may vary somewhat. It is also to be understood that the terminology employed herein is used for the purpose of describing particular embodiments only and is not intended to be limiting since the scope of the present invention is limited only by the appended claims and equivalents thereof.

It must be noted that, as used in this specification and the appended claims, the singular forms "a", "an" and "the" include plural referents unless the context clearly dictates otherwise.

If nothing else is defined, any terms and scientific terminology used herein are intended to have the meanings commonly understood by those of skill in the art to which this invention pertains.

A dispersion as used herein refers to a system in which particles are dispersed in a continuous phase of a different composition. The term dispersion includes but is not limited to suspensions, colloids, and sols.

The present invention refers to a functionalized surface structure produced by applying $TiO_2$ nanoparticles to a substrate.

The adhesion of the particles is improved compared to prior art. Without wishing to be bound by any specific scientific theory the inventors believe that the improved adhesion is due to a combination of at least two causes. Firstly, due to good distribution of nanoparticles on the surface and in the pores. Secondly, due to chemical binding between the $TiO_2$ and $SiO_2$ without a binder. The improved chemical binding between the $TiO_2$ and $SiO_2$ without a binder is attributed to the high fraction of Ti leachable in HCl. The adhesion is in general improved between $TiO_2$ and protonatable acidic oxides due to the high fraction of Ti leachable in HCl.

The inventors believe that the catalytic action of the particles on the substrate surface can be described as a two-step process, in particular for particles comprising at least one core and a surrounding layer. The compound to be reacted, for instance NO is in a first step adsorbed to the surrounding layer. Subsequently the compound to be reacted is transported to the core(s). The majority of the molecules react at the core(s). A good catalytic particle should thus have a surrounding layer where the adsorption of the compound to be reacted is adsorbed in a good way and a core(s) where the catalyzed reaction can take place.

A beneficial distribution of nanoparticles is in one embodiment obtained by preparing a pH-matched dispersion with very good nanoparticle dispersability. The pH matching to the substrate is to prevent aggregation during the application and subsequent curing. A pH value which is suitable with respect to the substrate is selected so that the particles do not aggregate or aggregate only to a minor extent. In one embodiment the pH of the dispersion comprising particles is adjusted to a value within pH 8-11. 8-11 is suitable for cement. For old cement a lower pH is suitable, such as 8-9, whereas for newer cement a higher pH is suitable such as 9-10. In one embodiment the pH of the dispersion comprising particles is adjusted to a value of 9 or higher. In an alternative embodiment where for instance a fabric is to be coated the pH is adjusted to a neutral value around pH 7.

The invention give well distributed small particles that can be absorbed faster and deeper into the pores of the substrate. As shown in example 6, particles can penetrate several hundreds of micrometers into the material and in some embodiments of the invention; the majority of the active material exists in the substructure of the substrate. A large fraction of active material in the substructure gives better wear properties.

In one embodiment of the invention, the dispersion is transparent or semi-transparent.

As shown in example 1, the adhesion of the $TiO_2$ to the substrate is proven. The adhesion increases significantly when curing over several days.

Since the good adhesion is not based on the use of a binder, adhesion is not reduced due to the originally present organic materials being broken down by the photocatalysis.

The active surface available for pollution breakdown depends on the specific surface of the substrate, and optimizing the substrate porosity and specific surface gives further increase in performance.

The particle dispersion can be used for many different purposes. One purpose is for preparing a surface with adsorbed particles where the catalytic properties of the particles are utilized. The inventors believe that the catalytic action of the particles can be described as a two-step process, in particular for particles comprising at least one core and an at least partially surrounding layer. The compound to be reacted is in a first step adsorbed to the surrounding layer. Subsequently the compound to be reacted is transported to the core(s). The majority of the molecules to be reacted react at the core(s). A good catalytic particle should thus have a surrounding layer where the adsorption of the compound to be reacted is adsorbed in a good way and a core(s) at which the catalyzed reaction can take place. A high (i.e 50 wt % or more) fraction of Ti leachable in 37% HCl give improved adsorbtion of $NO_x$ and other gases. Further it has turned out that the at least partially surrounding layer with a high content of Ti leachable in 37% HCl is porous facilitating transport of gases. The layer with a high content of Ti leachable in 37% HCl is further rich in hydroxyl groups.

According to the invention, the nanoparticles comprise a significant fraction of Ti leachable in HCl 37% (50 wt % or more). The leachability is determined by treating $TiO_2$ particles in 37% HCl at 55° C. for an extended period of several hours, such as at least 5 hours or more such as 17 hours. The treatment time should be sufficiently long to reach a plateau value for the concentration of leached material in the HCl. The skilled person can perform a routine experiment as already described in this application and verify a sufficiently long treatment time to reach equilibrium. The particles should be leached until equilibrium. A skilled person realizes that in theory equilibrium may not be reached even after many hours, but in practice a value of ±1 wt % within the true equilibrium value is considered to be equilibrium in a practical experiment. The leached Ti in solution is measured and the fraction of leached Ti can be calculated. All fractions are calculated by weight.

As shown in example 4, the fraction of amorphous material can be reduced by thermal treatment. Since the particles can show a high leachable fraction while XRD analysis shows 100 wt % anatase, this leachable fraction is concluded to consist of one of more amorphous forms of titanium oxides ($TiO_2$ or substochiometric $TiO_{(2-x)}$). It is conceived that the particles comprise titanic acid with the general formula $[TiO_x(OH)_{4-2x}]_n$. Zeolitic water is present in the particles.

The high fraction of Ti leachable in 37% HCl at 55° C. is obtained by carefully controlling the growth of nanoparticles. It is possible to start with a solution/dispersion of titanic acid which is heated to initiate growth of nanoparticles. When the nanoparticles are formed amorphous particles start to form which to a large extent are leachable in 37% HCl at 55° C. When the material which is leachable in 37% HCl has formed the crystalline material starts to grow. The crystalline material is not or only to a very minor extent leachable in 37% HCl. Thus it is possible to abort the heating early in order to obtain particles with a high fraction of leachable material.

The high amorphous content nanoparticles (more than 50 wt % of the Ti leachable in 37% HCl) are observed to give better transparency and dispersion stability in the precursor dispersion. Powders with high amorphous content in the nanoparticles are also observed have better redispersability than highly crystalline powders. A model of the particles as at least one crystalline core surrounded by layer(s) of amorphous material can explain the advantages in crosslinking, dispersion stability and powder redispersability since all of these are connected to surface mechanisms and not bulk composition.

As shown in example 1, the precursor dispersion contains no organic or inorganic binders, nor is it necessary to apply a binder on the substrate before applying the precursor dispersion.

The preparation of the precursor dispersion is not observed to have any significant effect on the basic nanoparticle properties, only on additives on the nanoparticle surface. The precursor dispersion can be applied to the substrate in a single step by spraying or by conventional coating methods such as roll-coating, doctor blading, dip-coating etc. As shown in example 5, the precursor dispersion can be applied during the production of cementitous products such as bricks and paving stones. The precursor dispersion can be applied to the surface before, after or during the curing of the cementitous material. Combinations of application before, during and after curing are also encompassed.

The amount of $TiO_2$ used in the product can be varied in the order of 0.5-200 g per square meter. Higher numbers give higher absolute efficiency, while lower numbers give higher efficiency per amount of $TiO_2$ added.

The thickness of the $TiO_2$-containing layer is mainly determined by viscosity of the precursor dispersion and the pores of the substrate, since the nanoparticles enter the material via physical absorption into the pores. As shown in example 6 and FIG. 1, high concentrations of $TiO_2$ can be found in pores at least 300 micrometers into the substructure of the substrate. Preparing precursor dispersions with different viscosity controls the penetration and thus the thickness of the functionalized layer, allowing the surface to be optimized for cost-effectiveness versus wear of the substrate.

As shown in example 3, the pollution breakdown performance of the present product is significantly better than the best ISO-test results published for comparable products, such as the investigation by Hüsken et al (2007).

In a first aspect there is provided a substrate comprising a surface, said surface comprising particles in the size range 2-500 nm, said particles comprising $TiO_2$, wherein at least 50 wt % of the Ti in the particles is leachable in 37% HCl.

It is understood that the beneficial effects of a high fraction of Ti leachable in 37% HCl start already at 50 wt %, but that the beneficial effects are improved at 55 wt % and more pronounced at 60 wt %. At even higher fractions of leachable material the advantages can be further pronounced. However one drawback of a very high fraction of leachable material (such as 70-80 wt % Ti) is that the yield during the manufacturing process is impaired. Thus in one embodiment at least 50 wt % of the Ti in the particles is leachable in 37% HCl. In another embodiment at least 55 wt % of the Ti in the particles is leachable in 37% HCl. In yet another embodiment at least 60 wt % of the Ti in the particles is leachable in 37% HCl. In a further embodiment at least 65 wt % of the Ti in the particles is leachable in 37% HCl. In another embodiment at least 70 wt % of the Ti in the particles is leachable in 37% HCl.

In one embodiment at least of part of said particles comprise at least one core and an at least partially surrounding layer, wherein more than 90 wt % of the total amount of Ti leachable in 37% HCl is in the surrounding layer. In an alternative embodiment more than 95 wt % of the total amount of Ti leachable in 37% HCl is in the surrounding layer. The embodiments with at least one core and a surrounding layer is often several cores embedded in a surrounding layer.

In one embodiment the substrate comprises protonatable acidic oxides. In one embodiment the substrate comprises at least one selected from the group consisting of cementitous, stone, silicate, and aluminasilicate. In one embodiment the substrate comprises $SiO_2$.

It is conceived that the particles comprise at least one, and often a number of parts which are crystalline, and which are surrounded by material which to a large extent is amorphous. In one embodiment each of said particles comprise at least one crystalline part and a layer, which layer at least partially surrounds the at least one crystalline part, wherein 90 wt % or more of the total amount of Ti leachable in 37% HCl is in the layer. In an alternative embodiment more than 95 wt % of the total amount of Ti leachable in 37% HCl is in the layer. In these embodiments the crystalline parts or core(s) comprises Ti which is not leachable to any significant extent. The leachable Ti is essentially in the layer at least partially surrounding the crystalline parts.

In one embodiment the substrate is porous and there is a porous substructure below the surface and wherein at least a part of the particles have penetrated at least 200 μm into the porous substructure. In one embodiment at least 65 wt % of the catalytically active $TiO_2$ is in the porous substructure. In one embodiment the substrate is porous and there is a porous substructure below the surface and wherein at least a part of the particles have penetrated at least 300 μm into the porous substructure.

In one embodiment the average size of the particles is in the range 5-50 nm. For a spherical particle the size is defined as the diameter. For a non-spherical particle the size is the largest size in any direction. Average size of the particles is intended to mean the average of all particles. In an alternative embodiment the average size of the particles is in the range 15-30 nm.

In one embodiment at least a part of the particles comprise at least one core and a surrounding layer, and wherein the at least one core comprises at least 95 wt % anatase. In an alternative embodiment the core comprises at least 50 wt % anatase.

In one embodiment the removal of nitric oxide as measured according to ISO 22197-1:2007 is at least 60 wt %. In an alternative embodiment the removal of nitric oxide as measured according to ISO 22197-1:2007 is at least 40 wt %. removal of nitric oxide as measured according to ISO 22197-1:2007 is at least 50 wt %. removal of nitric oxide as measured according to ISO 22197-1:2007 is at least 70 wt %.

In a second aspect there is provided a method of manufacturing a coated substrate, said method comprising the steps of:
c) preparing a dispersion comprising particles in the size range 2-500 nm, said particles comprising $TiO_2$, wherein at least 50 wt % of the Ti in the particles is leachable in 37% HCl,
d) contacting the dispersion with the substrate to be coated.

In one embodiment the dispersion to be contacted with the substrate comprises at least one selected from the group consisting of monoethanolamine, diethanolamine, and triethanolamine.

In one embodiment the amount of $TiO_2$ is from 0.5 to 200 g/m². In an alternative embodiment the amount of $TiO_2$ is lower than 30 g/m². In another alternative embodiment the amount of $TiO_2$ is lower than 15 g/m². In another alternative embodiment the amount of $TiO_2$ is lower than 50 g/m². The amounts include $TiO_2$ in any pores of the substrate. $TiO_2$ in a porous substructure, if present is included in these amounts. The porous substructure is about the outer 300 μm of an ordinary cementitous substrate.

In one embodiment a precursor dispersion is contacted with the substrate to be coated prior to contacting the dispersion with the substrate to be coated.

In one embodiment the substrate is dried by heating to a temperature not exceeding 250° C. In one embodiment the substrate is dried by heating to a temperature not exceeding 200° C. If the temperature is increased to a value of about 300-400° C. or more the advantageous high fraction (50 wt % or more) of Ti leachable in 37% HCl is lost.

In one embodiment the aqueous dispersion has the ability to form a gel with increased viscosity upon drying and also at other conditions. The viscosity is increased compared to the aqueous dispersion before gelation. The fact that at least 50 wt % of the Ti in the particles is leachable in 37% HCl gives that the particles form a gel like phase upon standing, drying and/or heating. The gelation is reversible and the gel can quickly and easily be turned into a liquid with dispersed particles by shaking. The gelation has the advantage that the liquid can be shaken and applied to the substrate as a liquid where the liquid penetrates the pores of the material and wets the surfaces including the surfaces of the pores. When the liquid has entered the pores and starts to dry, the liquid forms a gel and gelates in the pores, subsequently it dries. The gelation during the drying after penetration of the pores gives a better particle coating.

Other features and uses of the invention and their associated advantages will be evident to a person skilled in the art upon reading the description and the examples.

It is to be understood that this invention is not limited to the particular embodiments shown here. The embodiments are provided for illustrative purposes and are not intended to limit the scope of the invention since the scope of the present invention is limited only by the appended claims and equivalents thereof.

EXAMPLES

All percentages are calculated by weight if not clearly stated otherwise.
Producing an Acidic Titania 27.1 kg of $TiOCl_2$ was diluted with 13.8 kg deionized water and left overnight. The diluted $TiOCl_2$ solution was neutralized with 77.2 kg of aqueous NaOH and 16.2 kg of $(Na)_2CO_3$ in a stirred reactor to yield a final solution pH below 5. To this was added a solution of 63.7 kg $TiOCl_2$ and 1.9 kg surfactant yielding a transparent solution with a temperature of 40.4° C. To this clear solution, 1.9 kg of acetylacetone was added followed by heating for 35 minutes until the temperature was 81.9° C. The temperature was held constant for a further 75 minutes, followed by cooling from 81.7° C. to 50.9° C. The resulting 198.8 kg nanotitania dispersion yielded 196.6 kg of reaction product. The product was filtered through a nanofiltration unit combining washing and concentration steps to obtain a final pH of 1.1 and approximately 20% weight concentration of $TiO_2$. These particles were utilized for the following examples unless otherwise is clearly stated.

Example 1

Preparation of Functionalized Surface from High Stability, pH-matched $TiO_2$ Dispersion An aqueous titanium dioxide dispersion was prepared comprising 15 wt % titania as 3 wt % triethanolamine and 3 wt % monoethanolamine. The pH was further adjusted to pH=10 by addition of potassium hydroxide. The dispersion was roll coated or sprayed onto grey and red brick surfaces and dried in ambient conditions for several days. After drying, the brick surface appeared unchanged with no visible change in color and no speckles. Under UV-vis lamp, the functionalized surfaces displayed high degradation rates for Rhodamine-B on the surface.

Example 2

Investigation of Adhesion

Two brick samples were coated with a titanium dioxide composition comprising 15 wt % titania as nanoparticles, 3 wt % triethanolamine and 3 wt % monoethanolamine. The pH was further adjusted to pH=10 by addition of potassium hydroxide. After overnight drying at room temperature, the first sample was washed with water by placing it upside-down in a vigorously stirred water bath overnight. The presence of TiO$_2$ nanoparticles were clearly detected in the water upon addition of 1:1 ratio of 37% hydrochloric acid.

The second sample was further cured at ambient conditions for 5 days before undergoing the same washing cycle. In the case of the second sample, no TiO$_2$ was detected in the water after the test. The results clearly demonstrate that several days curing embedded the titania nanoparticles into the brick without being washed away.

Example 3a

Investigation of NO Removal Rate

Five samples of coated surfaces were sent for analysis of air purification performance according to ISO 22197-1: 2007, using NO as the model pollutant. Procedures and equipment used were identical to that described in Hüsken et al (2007) and Yu and Brouwers (2009). All samples were tested at 1±0.01 ppm NO inlet concentration, 50% relative humidity, 19.8±0.1° C., 3.0 l/min flow rate and 10.0 W/m$^2$ irradiance. Samples VI-I/II and VII-I/II were roll-coated samples according to the present invention, whereas sample IV was produced by mixing precursor dispersion into the cement mix before making the substrate.

Results show very high NO and total NOx removal rates for the samples according to the present invention.

| Sample | NOcon(wt %) | NO2, gen(wt %) | NOx, con(wt %) |
|---|---|---|---|
| IV | 1.7 | 0.0 | 1.7 |
| VI-I | 78.6 | 28.2 | 50.4 |
| VI-II | 63.0 | 29.5 | 33.5 |
| VII-I | 74.0 | 25.5 | 48.5 |
| VII-II | 75.3 | 19.0 | 56.3 |

Example 3b

Investigation of NO Removal Rate

Protoype samples for photocatalytic paving stones were sent for analysis of air purification performance according to ISO 22197-1:2007, using NO as the model pollutant. Procedures and equipment used were identical to that described in Hüsken et al (2007) and Yu and Brouwers (2009). All samples were tested at 1±0.01 ppm NO inlet concentration, 50% relative humidity, 19.8±0.1° C., 3.0 l/min flow rate and 10.0 W/m$^2$ irradiance. All samples contained Joma nanoparticles and were spray-coated and cured according to the present invention. Note that the amount of material sprayed varied, so that the "5%" samples contained more than 5 times the TiO$_2$ of the "1% dispersion" sample.

The results show record high numbers for the largest amount if TiO$_2$ used, but better performance per gram TiO$_2$ for the "5%" samples. Using too low amounts of TiO$_2$ gives very poor results, which is explained by essentially all the nanoparticles being sucked into the deepest pores where performance is poor. The effect of adding an IR lamp is inconclusive.

| Sample | NOcon(%) | NOx, con(%) |
|---|---|---|
| 1% dispersion | 4.3 | 4.0 |
| 5% with IR | 76.3 | 35.0 |
| 5% without IR | 75.0 | 39.5 |
| 15% dispersion | 87.6 | 63.1 |

Example 4

Investigation of Amorphous Content of Nanoparticles

Various samples containing TiO$_2$ nanoparticles were dissolved in concentrated HCl in an amount of ca 10 g HCl 37% per gram of TiO2-containing product, enough to leach any amorphous TiO$_2$ present in the product.

Two different Joma acidic TiO$_2$ dispersions were treated with nano filtration, cationic and anionic exchangers until a pH=6.2 was reached. Excess amounts of 37% HCl was added to the samples. The vials were shaken at 55° C. for 17 hours.

Two samples of the second Joma dispersion, after treatment to pH=6.2, were dried at 60° C. and sintered at different temperatures. The sintered samples were added to excess amounts of 37% HCl. The vial was shaken at 55° C. for 17 hours.

A third Joma dispersion, after treatment to pH=6.2, was dried at 100° C. and sintered at 200° C. The samples were added to excess amounts of 37% HCl. The vials were shaken at 55° C. for 18 hours and the solid fraction weighed after washing and air drying for 96 hours followed by heating at 50° C. for 1 hour.

Two different Cristal Millennium product samples (dispersions) were mixed with excess amounts of 37% HCl. The vials were shaken at 55° C. for 6-40 hours.

Evonik Degussa P25 powder was added to excess amounts of 37% HCl. The vial was shaken at 55° C. for 24 hours.

In all the cases the resulting almost clear samples were analysed for Ti content

| Sample | Initial TiOwt % | Leaching time | Clear solution Ti[aq]wt % | Unleached/initial TiO2 |
|---|---|---|---|---|
| Joma sample A | 0.68 | 17 h | 0.30 | 0.25 |
| Joma sample B | 1.02 | 17 h | 0.44 | 0.27 |
| Joma sample B sintered at 300° C. for 90 min | 2.44 | 17 h | 0.72 | 0.71 |
| Joma sample B sintered at 500° C. for 30 min | 2.19 | 17 h | 0.24 | 0.89 |
| Joma sample C | 7.75 | 18 h | — | 0.54 |
| Joma sample C sintered at 200° C. for 18 h | 7.75 | 18 h | — | 0.64 |
| Cristal Millennium s5300A | 4.09 | 6 h | 0.386 | 0.84 |

-continued

In all the cases the resulting almost clear samples were analysed for Ti content

| Sample | Initial TiOwt % | Leaching time | Clear solution Ti[aq]wt % | Unleached/initial TiO2 |
|---|---|---|---|---|
| Cristal Millennium s5300A | 2.95 | 24 h | 0.616 | 0.64 |
| Cristal Millennium s5300A | " | 40 h | 0.637 | 0.63 |
| Cristal Milennium PC500 | 4.45 | 18 h | 0.69 | 0.73 |
| Degussa P25 | 17.5 | 24 h | 0.27 | 0.974 |
| Joma sample A | 0.68 | 17 h | 0.30 | 0.25 |
| Joma sample B | 1.02 | 17 h | 0.44 | 0.27 |
| Joma sample B sintered at 300° C. for 90 min | 2.44 | 17 h | 0.72 | 0.71 |
| Joma sample B sintered at 500° C. for 30 min | 2.19 | 17 h | 0.24 | 0.89 |
| Cristal Millennium s5300A | 4.09 | 6 h | 0.386 | 0.84 |
| Cristal Millennium s5300A | 2.95 | 24 h | 0.616 | 0.64 |
| Cristal Millennium s5300A | " | 40 h | 0.637 | 0.63 |
| Cristal Milennium PC500 | 4.45 | 18 h | 0.69 | 0.73 |
| Degussa P25 | 17.5 | 24 h | 0.27 | 0.974 |

The results support the following three claims: First, that leaching times of 17 hrs are sufficiently long to obtain reliable data for comparison. Second, that the amount of crystalline $TiO_2$ depends on the method of producing $TiO_2$ and can be controlled by thermal treatment: Evonik Degussa process is known to have a calcination step that ensures highly crystalline particles, while Cristal and Joma use wet chemical processes. Thirdly, that the Joma $TiO_2$ nanoparticles show a significant difference in structure from the other tested $TiO_2$ nanoparticles.

Example 5

Investigation of Industrial Applicability

A spray unit and an IR heating unit were added to a commercial production line for paving stones. The precursor dispersion was applied to the stones via the spraying unit. Production tests were run with and without IR-treating the stones after applying the precursor dispersion. It was found that the added steps to create the functionalized surface did not affect the production rate, scalability or safety of the production line. The time needed to coat and IR treat a paving stone was a few seconds.

Example 6

Investigation of Pore Penetration

Figure 1B:
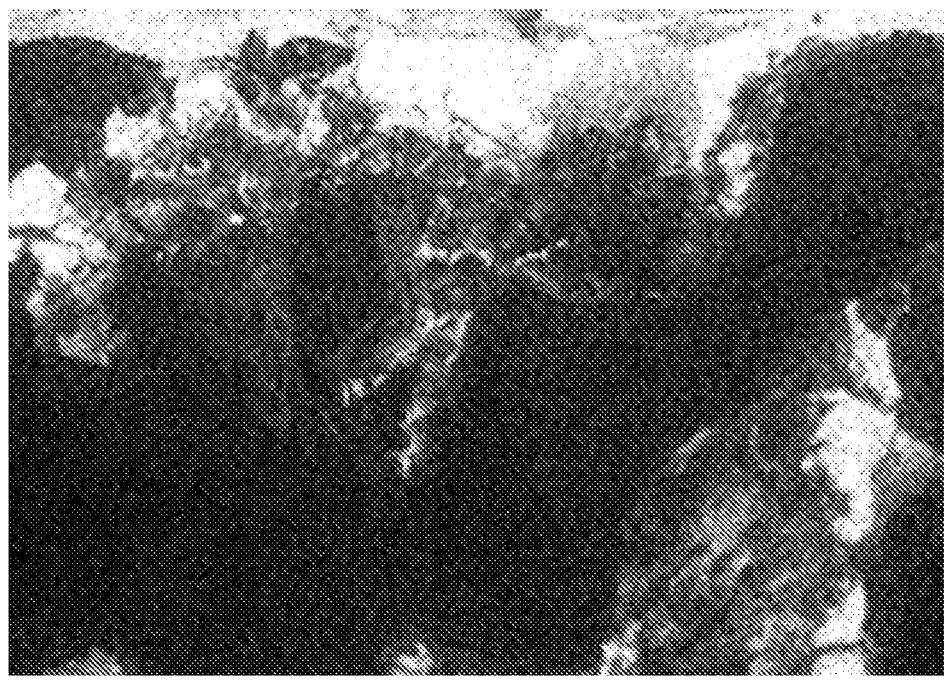

A paving stone sample according to the invention was fractured with a hammer and the cross section analysed by SEM. As seen in FIG. 1, the $TiO_2$ dispersion was observed to have infiltrated, wet and set in small and large pores at least 300 micrometer below the surface. The wetting was evidenced by thin 1-2 micrometer films on the inner pores. Analysis of the coverage indicated around 2.75 $g/m^2$ on the surface and around 8 $g/m^2$ in the substructure.

The invention claimed is:

1. A substrate comprising a surface, said surface comprising particles having an average size in the range 5-50 nm, said particles comprising $TiO_2$, wherein at least 55 wt % of the total amount of Ti in the particles is leachable in 37% HCl, wherein the leachability is determined by treating $TiO_2$ particles in 37% HCl at 55° C. for an extended period of several hours, until a plateau value for the concentration of leached material in the HCl is reached, wherein said substrate comprises protonatable acidic oxides, wherein at least a part of the particles comprise at least one core and a surrounding layer, and wherein the at least one core comprises at least 95 wt % anatase.

2. The substrate according to claim 1, wherein said substrate comprises at least one material selected from the group consisting of cement, stone, silicate, and aluminasilicate.

3. The substrate according to claim 1, wherein each of said particles comprise at least one crystalline part and a layer, which layer at least partially surrounds the at least one crystalline part, wherein 90 wt % or more of the total amount of Ti leachable in 37% HCl is in the layer.

4. The substrate according to claim 1, wherein the substrate is porous and wherein there is a porous substructure below the surface and wherein at least a part of the particles have penetrated at least 200 μm into the porous substructure.

5. The substrate according to claim 4, wherein at least 65 wt % of catalytically active $TiO_2$ is in the porous substructure.

6. The substrate according to claim 1, wherein the substrate exhibits a removal of nitric oxide as measured according to ISO 22197-1:2007 of at least 60 wt %.

7. The substrate according to claim 1, wherein the surface is free of binder.

8. The substrate according to claim 1, wherein at least 60 wt % of the total amount of Ti in the particles is leachable in 37% HCl.

9. The substrate according to claim 1, wherein at least 65 wt % of the total amount of Ti in the particles is leachable in 37% HCl.

10. The substrate according to claim 1, wherein at least 70 wt % of the total amount of Ti in the particles is leachable in 37% HCl.

11. A method of manufacturing a substrate with surface particles according to claim 1, said method comprising the steps of:
   a) preparing a dispersion comprising particles having an average size in the range 5-50 nm, said particles comprising $TiO_2$, wherein at least 55 wt % of the total amount of Ti is leachable in 37% HCl, wherein the leachability is determined by treating $TiO_2$ particles in 37% HCl at 55° C. for an extended period of several hours, until a plateau value for the concentration of leached material in the HCl is reached, wherein at least a part of the particles comprises at least one core and a surrounding layer, and wherein the at least one core comprises at least 95 wt % anatase;
   b) contacting the dispersion with a substrate comprising protonatable acidic oxides, and
   c) drying the substrate.

12. The method according to claim 11, wherein the dispersion comprises at least one selected from the group consisting of monoethanolamine, diethanolamine, and triethanol amine.

13. The method according to claim 11, wherein the amount of $TiO_2$ is from 0.5 to 200 $g/m^2$.

14. The method according to claim 11, wherein the amount of $TiO_2$ is lower than 30 $g/m^2$.

15. The method according to claim 11, wherein a precursor dispersion is contacted with the substrate prior to contacting the dispersion with the substrate.

16. The method according to claim 11, wherein the pH of the dispersion comprising particles is adjusted to a value of 8-11.

17. The method according to claim 11, wherein the substrate is dried by heating to a temperature not exceeding 250° C.

18. The method according to claim 11, wherein the dispersion is aqueous and has the ability to form a gel with increased viscosity upon drying.

* * * * *